United States Patent

Trent

[15] 3,665,313

[45] May 23, 1972

[54] LOCATION IDENTIFICATION SYSTEM

[72] Inventor: Robert L. Trent, Marblehead, Mass.

[73] Assignee: The United States of America as represented by the Administrator of the National Aeronautics and Space Administration

[22] Filed: July 13, 1970

[21] Appl. No.: 54,270

[52] U.S. Cl. ....................................325/55, 325/38, 325/51, 325/58, 325/64, 325/141, 325/302, 325/325, 178/69.5, 340/167

[51] Int. Cl. ..........................................................H04b 1/00

[58] Field of Search................325/38, 114, 51, 115, 55, 302, 325/58, 325, 64, 141; 340/174, 206, 167; 179/15 BS, 69.5

[56] References Cited

UNITED STATES PATENTS 3,510,777 5/1970 Gordon....................................325/55

*Primary Examiner*—Benedict V. Safourek
*Assistant Examiner*—Albert J. Mayer
*Attorney*—Herbert E. Farmer and John R. Manning

[57] ABSTRACT

This disclosure describes a location identification system for identifying a particular ground location from among a plurality of ground locations. Each ground location includes a transmitter that transmits a continuous tone signal when the transmitter is activated. Each transmitter also includes a binary encoder for encoding the continuous tone signal at spaced intervals. Each binary code uniquely identifies the particular transmitter with which it is associated. An aircraft flying above ground locations carries a receiver for receiving the continuous tone signal transmitted by an activated transmitter, and a decoder for decoding the binary encoded portion of the signal. A display device is provided for displaying the identity of the ground location determined as a result of decoding the encoded portion of the signal.

26 Claims, 11 Drawing Figures

INVENTOR
ROBERT L. TRENT

BY Herbert F. Farmer
ATTORNEY

INVENTOR
ROBERT L. TRENT

BY Herbert E. James

ATTORNEY

INVENTOR
ROBERT L. TRENT

BY Herbert E. Tarner
ATTORNEY

INVENTOR
ROBERT L. TRENT

BY Herbert S. Jarvis
ATTORNEY

INVENTOR
ROBERT L. TRENT

BY [signature]

ATTORNEY

INVENTOR
ROBERT L. TRENT

LOCATION IDENTIFICATION SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is directed to location identification systems and more particularly, to a system for identifying a particular ground location from among a set of ground locations.

Various types of systems for "homing-in" on a particular location have been proposed, and some are in use. These systems generally comprise ground based transmitters that emit signals at different frequencies — each frequency being related to a particular transmitter. Mobile transportation mediums, such as aircraft, boats, automobiles, etc., contain receivers that are tunable to these frequencies. When it is desired to identify a particular ground location, the receiver in a mobile transportation medium is tuned to the frequency of the transmitter located at the ground location to be identified. Depending upon the type of system, a display means coupled to the receiver provides an indication of the direction of the ground location from the mobile transportation medium. For example, the mobile transportation medium may include a highly directional antenna which is movable until the receiver generates a maximum signal. The direction of the antenna is then related to the direction of the transmitter from the transportation medium. Alternatively, the transmitter may generate a fixed phase signal and a variable phase signal. The two signals are combined in a receiver to provide an indication of the direction of the transmitter from the receiver. In other words, prior art systems generally identify a location by the frequency transmitted and identify the direction of the location by antenna or electronic means.

While systems of the foregoing and similar nature are adequate in some environments, they are inadequate in other environments. For example, these systems are undesirable for use in metropolitan areas to identify locations where fire or police help is needed. More specifically, a multiple frequency system requires constant band switching, in a scanning manner, to determine when a particular transmitter has been activated. Further, the signal reflections caused by high-rise buildings create signal ambiguities, thereby making the frequency of the signal difficult to identify. In addition, it is difficult to home-in on an activated transmitter because of the multiple radio-transmission paths created by high-rise structures reflecting the transmitted signal. Moreover, if two transmitters are simultaneously activated, the receiving system may oscillate between two directions thereby causing further ambiguity problems. While these problems are somewhat reduced by the use of aircraft, such as airplanes or helicopters, to home-in on a desired location, this is not an entire solution to the problem, particularly in view of the fact that many transmitters must be located near ground level and thus will be surrounded by high-rise structures, thereby reducing the aircraft advantage.

Therefore, it is the object of this invention to provide a new and improved location identification system.

It is also an object of this invention to provide a location identification system wherein each location is uniquely identified.

It is yet another object of this invention to provide a new and improved location identification system wherein a plurality of transmitters located at a plurality of locations emit signals, each signal being uniquely identified so as to uniquely identify the location of its associated transmitter.

It will be appreciated by those skilled in the art and others that it is desirable to utilize commercially available transmitters and receivers operating on predetermined frequency bands in the location identification system of the invention because the use of such equipment will greatly reduce the overall cost of the system and also make the system readily available to police and fire departments as well as other social agencies.

Consequently, it is yet another object of this invention to provide a new and improved location identification system that utilizes commercially available transmitters and receivers.

SUMMARY OF THE INVENTION

In accordance with principles of this invention, a location identification system for identifying a particular location from among a plurality of locations is provided. The location identification system of the invention comprises a plurality of transmitters located at the locations to be identified. Each transmitter generates a continuous tone signal when it is activated. Preferably, the frequency of the continuous tone signal is the same for all transmitters. Each continuous tone signal is modulated at spaced points in time by a binary encoder. The binary encoder applies a code to the continuous code signal that is uniquely related to the particular location associated with a particular transmitter. Hence, the tone signal generated by each transmitter includes a binary code that uniquely identifies the location of the transmitter. A receiver receives the continuous tone signal generated by an activated transmitter, emits an audio signal and causes an indicating lamp to be lit to indicate that a transmitter has been activated. A decoder connected to the receiver decodes the binary coded portions of the continuous tone signal and applies the decoded signal to a display. The display indicates the location of the activated transmitter by a unique decimal code.

In accordance with further principles of this invention, Continuous Tone-Controlled Squelch System (CTCSS) receivers and transmitters are used, whereby the tone is a low frequency (normally considered sub-audio) tone (15–300 Hz). In addition, the binary encoding is done at a sub-audio frequency. The sub-audio tone is applied by the receiver to a loud speaker or earphones, and is caused to activate an indicating lamp so that the operator of the receiver can determine that a transmitter has been activated. The sub-audio binary code is applied by the receiver to the decoder so that the eyes of the operator can determine the exact location of the activated transmitter.

In accordance with further principles of the invention, the transmitters are located at ground stations and the receiver is located in an aircraft (such as an airplane or helicopter) flying overhead. In accordance with a still further principle of this invention, one of the ground stations is a central controlled station that emits a continuous tone signal at predetermined-spaced intervals for receiver "check out" purposes. Preferably, the central control station has a binary code that uniquely identifies it as the central control station and not as one of the transmitting location identification stations.

It will be appreciated from the foregoing summary of the invention that a novel location identification system is provided. Because the system utilizes a continuous tone signal, the activation of any of the transmitters is immediately recognized by the operator of the receiver. In addition, because the continuous tone signal is modulated by a unique binary identification code, information about the location of the transmitter is immediately available to the operator via a display device. The display device can be any one of various types of display devices such as a digital indicating device, a cathode ray tube or other similar display devices. Further, because the invention uses CTCSS receivers and transmitters, it is inexpensive to operate and maintain. That is, such receivers and transmitters are commercially available at relatively low cost. Hence, the overall cost to install a system of the type contemplated by the invention is relatively low. Moreover, the metropolitan area reflection problems of conventional homing-in systems are eliminated by the use of unique binary identification codes.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

While the preferred use of the herein described invention is in metropolitan areas to detect the location of areas requiring civil aid (such as police or fire, for example), it will be appreciated from the following description that the invention can also be used to determine the location of other objects. For example, the invention can be used to aid in determining the location of "downed" aircraft if the aircraft includes a continuous tone transmitter modulated by a unique binary identification code.

Figure 1:
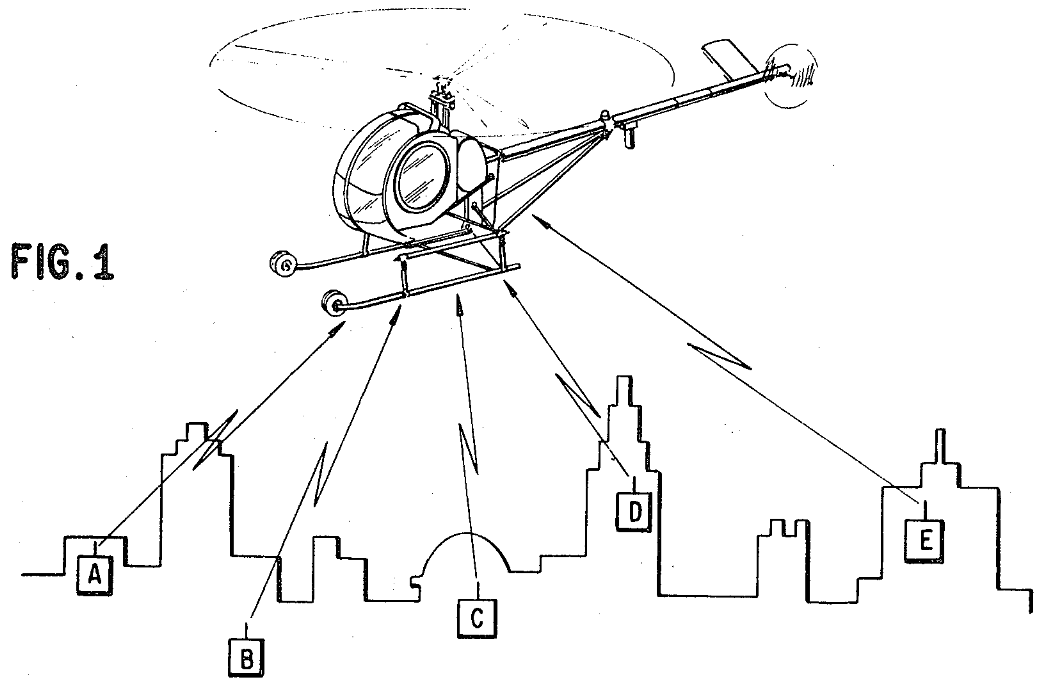
FIG. 1 is a pictorial diagram illustrating the general system of the invention.

FIG. 1 is a pictorial diagram illustrating the overall system of the invention and comprises a plurality of transmitters identified as A, B, C, D and E located at ground level and an aircraft flying above the transmitters. The aircraft may be an airplane or a helicopter, for example, and includes a receiver of the type hereinafter described. Each transmitter includes a means for generating a continuous tone signal of, preferably, the same frequency when the transmitter is activated. Activation of the transmitters is achieved by any suitable means, such as the closing of a switch, for example. The continuous tone signal is, as hereinafter described, uniquely modulated at spaced intervals by a binary code. The thusly coded continuous tone signal of an activated transmitter is received by the receiver located on board the aircraft. The received signal is demodulated and the demodulated signal is applied to a display means to provide a visual indication of the location of the activated transmitter as determined by the unique binary code related to that transmitter. In addition, the receiver is provided with a radio-direction-finding feature to enable the operator of the aircraft to home-in on the transmitting location, if required.

Figure 2:
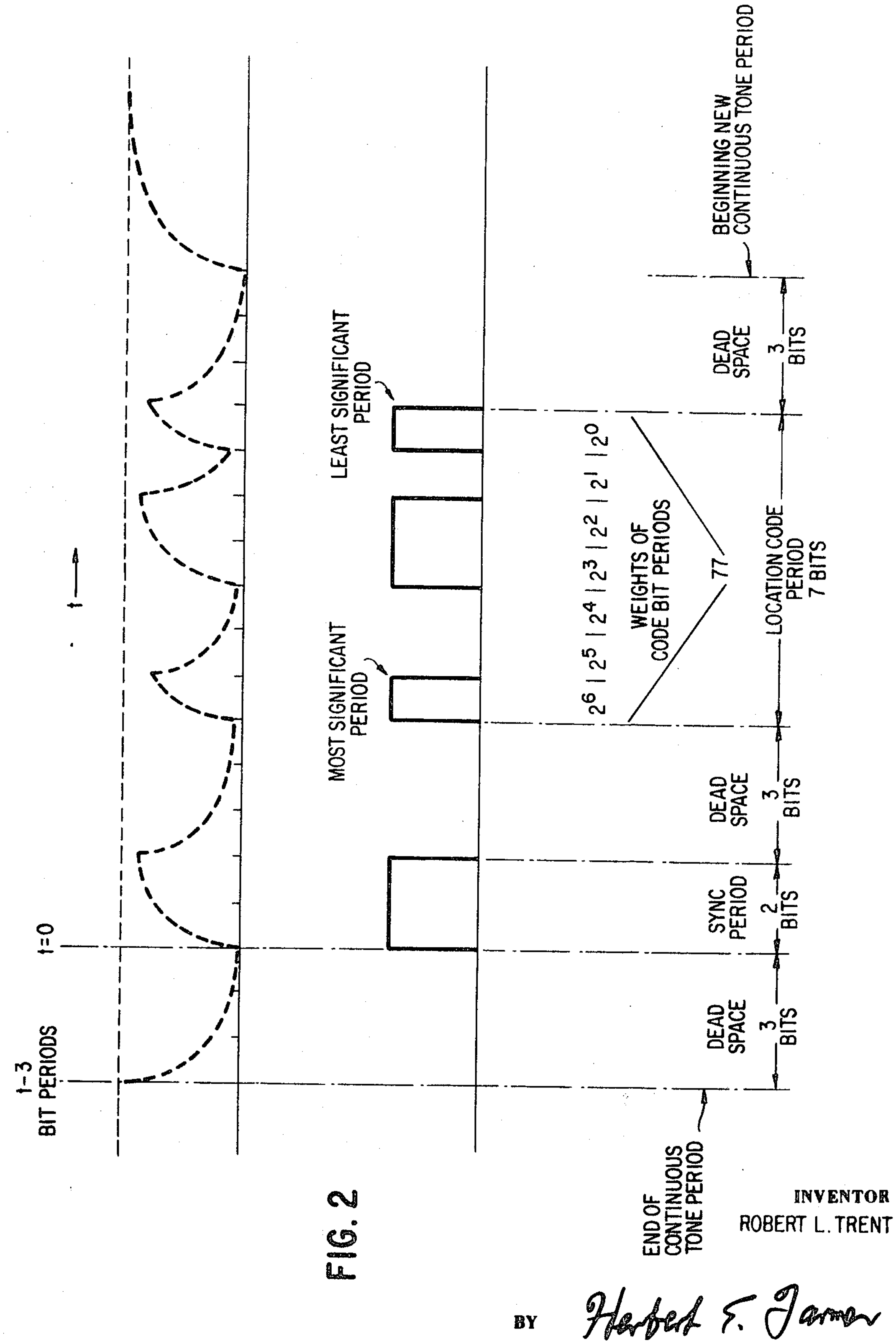
FIG. 2 is a binary code timing diagram.

For purposes of description, it is assumed that the aircraft is expected to cover a predetermined number of locations, 128, for example. For 128 locations, a seven bit binary code ($2^7$) is sufficient so that each location is uniquely identified. As previously stated, the continuous wave transmission of an activated transmitter is interrupted at predetermined spaced intervals to transmit the desired code. In order to provide synchronization and sufficient spacing between the bit location code and the bit synchronization code, a 12 bit binary code is preferrably used by the invention. The first two bits provide synchronization, the next three bits provide a dead space and the remaining seven bits provide the location identification code. A timing diagram of this bit arrangement is illustrated in FIG. 2 wherein a three bit dead space is provided on either side of the 12 bit binary code period. The first line of FIG. 2 illustrates the form of the received signal and the second line illustrates the signal after it is decoded. The third line represents the dead spaces; sync and location code periods in a time format. The location code illustrated in FIG. 2 is a typical example and corresponds to the number 77.

Figure 3:
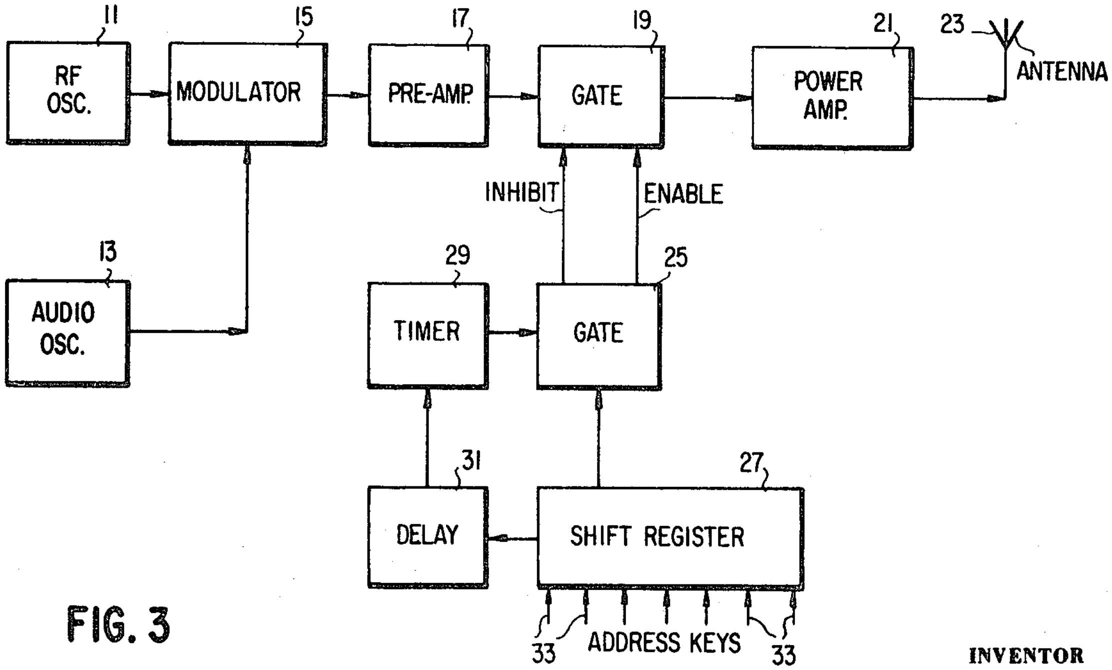
FIG. 3 is a block diagram illustrating a transmitter made in accordance with the invention.

FIG. 3 illustrates a transmitter made in accordance with the invention for generating a continuous tone signal and for interrupting the continuous tone signal to transmit a location identification code. The transmitter illustrated in FIG. 3 comprises: a radio frequency (RF) oscillator 11; an audio oscillator 13; a modulator 15; a preamplifier 17; a modulating gate 19; a power amplifier 21; a transmitting antenna 23; a control gate 25; a shift register 27; a timer 29; and, a delay circuit 31.

The output of the RF oscillator 11 is connected to one input of the modulator 15 and the output of the audio oscillator 13 is connected to the other input of the modulator 15. The modulator combines the two oscillator signals so as to generate an audio, continuous tone signal suitable for transmission. The thusly generated continuous tone signal is amplified by the preamplifier 17 and applied to the input of the modulating gate 19. The output of the modulating gate 19 is applied through the power amplifier 21 to the transmitting antenna 23. The shift register 27 has seven address keys 33 whereby a unique binary code which will identify a particular ground location can be generated by the shift register 27 associated with each transmitter. That is, by suitably activating or deactivating the address keys, the shift register can be set to generate one of the 128 binary codes previously discussed. A control output from the shift register is applied via the delay circuit 31 to the timer 29. The coded output of the shift register is applied to the signal input of the control gate 25. The control gate 25 also receives an inhibit input from the timer 29. The control gate 25 has enable and inhibit outputs which are applied to the enable and inhibit inputs of the modulating gate 19.

In operation, once the transmitter is activated (by means not shown), the modulator 15 generates the previously described continuous tone signal which is applied via the gate and the power amplifier to the transmitting antenna 23. At approximately the same time the shift register applies a control signal to the delay circuit 31. After a predetermined period of time has elapsed, the timer 29 enables the control gate 25. Thereafter, the control gate 25 enables and inhibits the audio modulated signal in accordance with the binary pulse signal received from the shift register; the most significant bit of the word is transmitted first in the sequence of modulated location code elements. The now pulse modulated signal is amplified by the power amplifier 21 and transmitted via the transmitting antenna 23. After the complete code has been transmitted, the timer inhibits further action by the control gate and the audio modulated or continuous tone signal is again transmitted. After a predetermined period of time, the timer again opens the gate 25 and the binary coding cycle is repeated. This action continues until the transmitter is deactivated.

Figure 4:
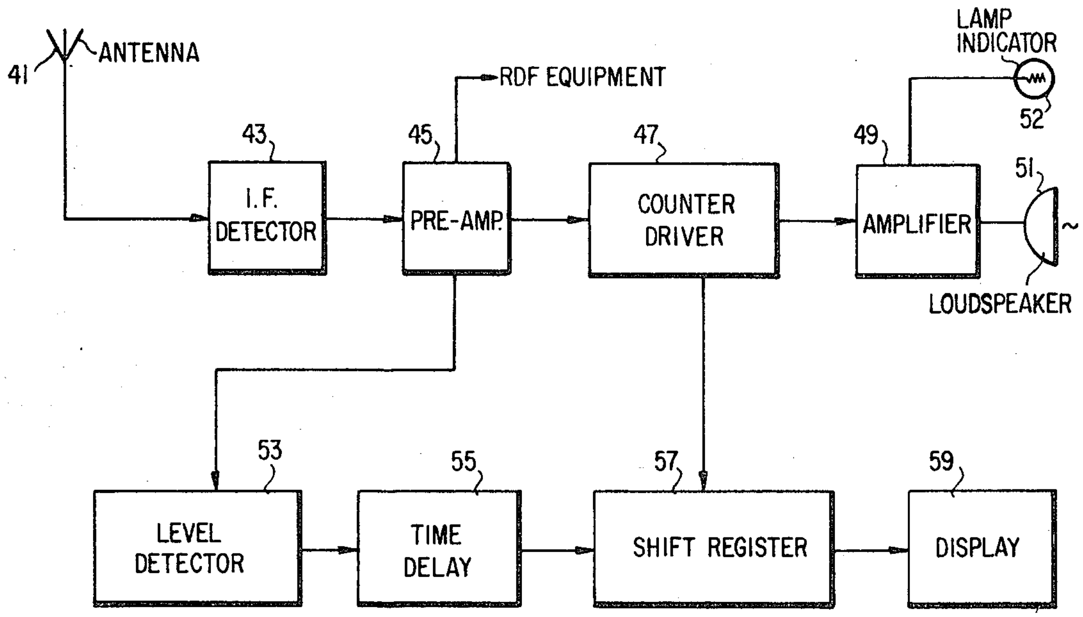
FIG. 4 is a block diagram of one embodiment of a receiver made in accordance with the invention.

FIG. 4 illustrates a receiver for receiving a continuous tone-interrupted signal of the type generated by the transmitter illustrated in FIG. 3. The receiver illustrated in FIG. 4 comprises a receiving antenna 41; an intermediate frequency (IF) detector 43; a preamplifier 45; a counter driver 47; an amplifier 49; a loud speaker 51; a lamp indicator 52; a level detector 53; a time delay circuit 55; a shift register 57; and a display 59. The signal received by the receiving antenna 41 is applied via the IF detector 43 to the input of the preamplifier 45. One output of the preamplifier is applied to the Radio Direction Finding (RDF) equipment (not shown). The RDF equipment provides a general indication of the direction of the transmitter from the aircraft. However, due to reflections caused by high buildings and other structures in a metropolitan area, the direction detected by the RDF equipment is not precise.

An output of the preamplifier 45 is also applied to the counter driver 47. The counter driver 47 applies the continuous tone portion of the received signal through the amplifier 49 to the loud speaker 51 where it is emitted as an audio tone, and as a visible signal via the indicating lamp 52 to alert the observer that a transmitter has been activated. If desired, the loud speaker 51 could be replaced by a single or a pair of earphones. It will be appreciated by those skilled in the art that while the outputs from the preamplifier 45 are illustrated in FIG. 4 as separate signals, they are actually the same signal with diodes in the various output lines to prevent coupling.

An output of the preamplifier 45 is also applied to the input of the level detector 53. The level detector 53 is actually a pulse detector that detects the binary coded portion of the incoming signal. The output from the level detector is applied via the time delay 55 to the pulse input of the shift register 57. The shift register also receives a control or enable signal from the counter driver 47 which controls its ability to count pulses. That is, when the counter driver 47 detects the synchronizing portion of the interrupted portion of the incoming signal, it enables the shift register 57. Thereafter, after the shift register has received an identification code, it applies an output in accordance with that code to the display 59. Thus, a display of the location of the transmitter transmitting the continuous tone signal is provided. If the display is an analog display, such as a cathode ray tube display, the display must include a suitable digital-to-analog converter to convert the received digital signal into analog form. Alternatively, if the display is a digital display, digital conversion techniques are incorporated to convert the received binary word into an equivalent decimal number.

While a transmitter of the type illustrated in FIG. 3 and a receiver of the type illustrated in FIG. 4 will carry out some of the objects of the invention, they will not meet all of the objects. Specifically, transmitters and receivers of this nature are not generally commercially available except by special order since their frequencies of operation must be specifically calculated and the oscillators, detectors, amplifiers and other subsystems must be specially designed for operation at the calculated frequencies. Hence, expensive special equipment is required. However, one of the objects of the invention is to keep the expense of the overall system as low as possible. Therefore, it is desired to use generally available commercial equipment with as little modification as possible. One such inexpensive, generally available equipment is Continuous Tone-Controlled Squelch System (CTCSS) equipment. CTCSS transmitters and receivers operate with modulation frequencies (tones) in the low frequency or sub-audio range (below 300 Hz). However, these receivers and transmitters require that up to 250 milliseconds (mS) occur before 75 percent of the maximum output appears at the output of the receiver. While this time period does not require extensive changes to the FIG. 3 transmitter, it does require some modifications to the receiver. More specifically, considering 67 Hz to be the lowest reasonable modulating frequency, a time period of 250 mS indicates that 17 cycles must be impressed on the receiver prior to 75 percent rated output achievement.

A mathematical analysis of the receiver characteristics for such a modulating frequency (67 Hz) and a time period of 250 mS is hereinafter set forth. Assuming that the build-up and decay of the signal are exponential functions, which is a reasonable assumption under the circumstances, the wave form illustrated in FIG. 5 will occur for a single cycle. Between $t=0$ and $t=250$ mS, where $t=$ time:

$$y = K(1-e^{-t/x}) \qquad (1)$$

wherein:

$K$ = a constant (1 or 100 percent)
$e$ = exponential function
$y$ = percentage of rated output
$x$ = unknown time factor At time $t=0$, $y=0$ for Equation (1). At the boundary condition $t=250$ mS and $y=0.75$, $x$ is calculated as follows:

$$0.75 = 1 - e^{-250/x}$$
$$1n\ 0.75 = 1n\ (1-e^{-250/x})$$
$$x = 180$$

Thus, the equations for the rise portion of the output of the receiver is:

$$y = k(1 - e^{-t/180}) \qquad (2)$$

Figure 5:
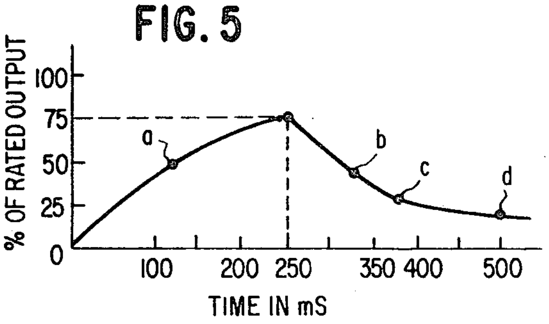
FIG. 5 is a wave form of a part of a low frequency wave.

Solving Equation (2) for a 50 percent response yields the following:

$$0.5 - 1 - e^{-t/180}$$

or:

$t = 123$ mS (point $a$ of FIG. 5)

Turning now the decaying portion of the cycle (from $t=250$ mS to $t=500$ mS) and assuming the same time constant, the following equation emerges:

$$y = 0.75e^{-(t-250)/180} \qquad (3)$$

Solving Equation (3) for a 50 percent response yields:

$$0.5 = 0.75e^{-(t-250)/180}$$

or:

$t = 325$ mS (point $b$ of FIG. 5)

Solving Equation (3) for $t=375$ mS yields $y=0.375$ (point $c$), and for $t=500$ mS yields $y=0.18$ (point $d$).

Figure 6:
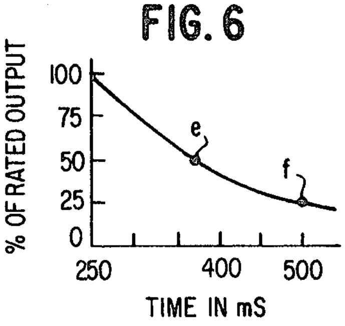
FIG. 6 is a diagram of the exponential decrease of a low frequency wave.

The foregoing analysis makes the potential problem obvious. Specifically, if the address code is of the form 1,0, 1,0, etc., eventually in the sequence at one of the ON (1) periods 100 percent of rated output will be attained. The problem then remains to determine the response in the succeeding OFF (0) period to determine if a detection level of less than 50 percent of the rated output has been realized. In this case, the exponential output starts from a 100 percent rated output as illustrated in FIG. 6.

The equation in this case is of the form:

$$y = e^{-(t-250)/180} \qquad (4)$$

Solving Equation (4) for a 50 percent response yields:

$$0.5 - e^{-(t-250)/180}$$

or:

$t = 375$ (point $f$ of FIG. 6)

From the foregoing mathematical analysis, it can be seen that the response at the end of the time period succeeding the 1,0,1,0, etc., sequence is approximately 25 percent. It will be appreciated by those skilled in the art that this response does not provide an adequate margin for amplitude differentiation between levels of ON and OFF, without problems of ambiguity.

Figure 9:
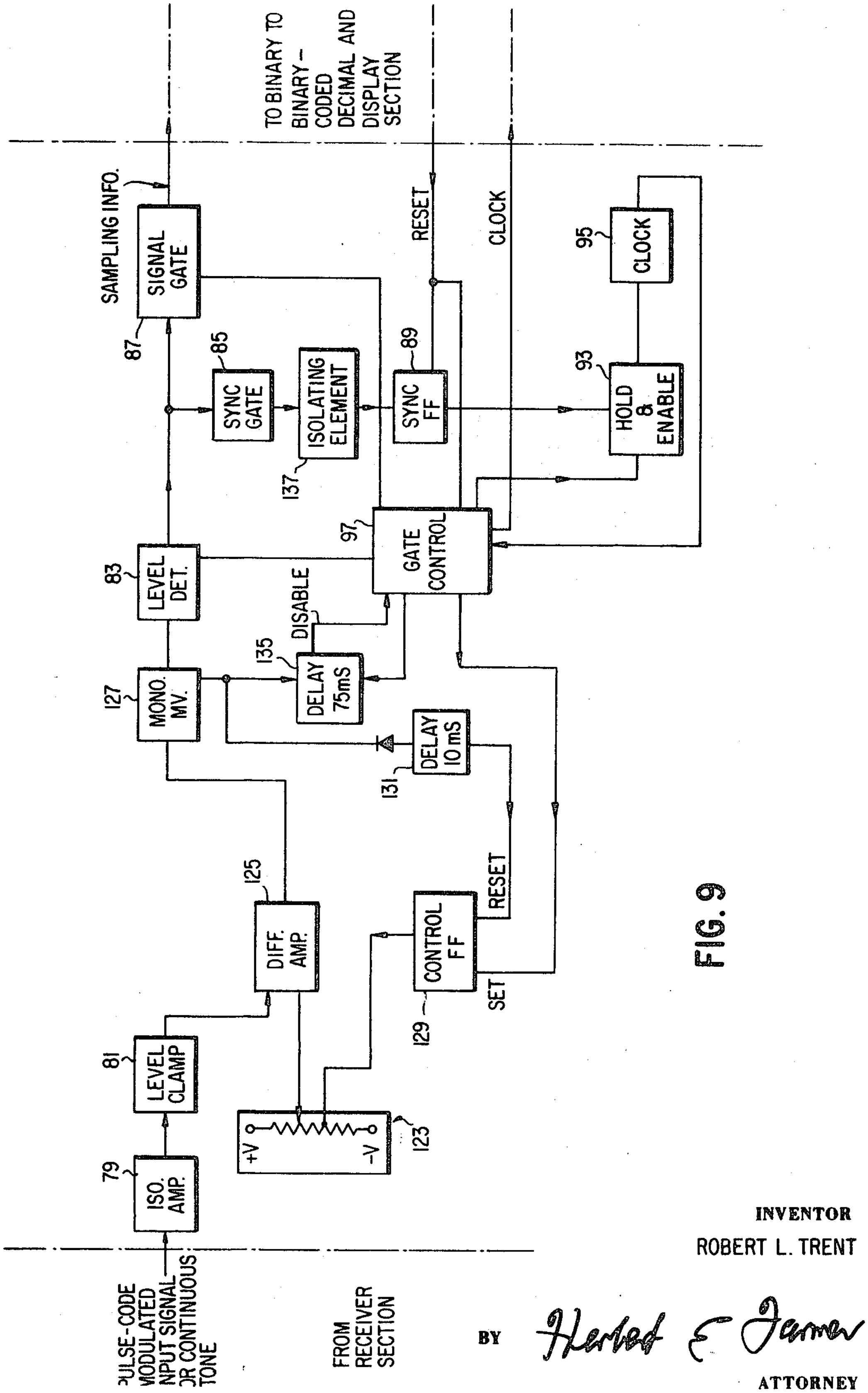
FIG. 9 is an alternative embodiment of a decoder made in accordance with the invention; and, FIGS. 10A and 10B are waveform diagrams that illustrate the level detection problem when a blank space follows an individual location pulse or a series of individual location pulses, respectively.

The foregoing analysis points up the need for four modifications; (1) the insertion of a delay prior to subsequent level sampling after the onset of the initial synchronizing pulse period (two bit periods), if it is assumed that level detection is set to occur at 50 percent of maximum amplitude to assure sequential sampling in following bit periods at a later point in time than the mid-bit periods; (2) the insertion of a fixed level clipping feature independent of the normal audio signal level output to assure a fixed maximum level for sampling; (3) the insertion of a faster exponential decay period during recovery than is normally present in a CTCSS receiver to avoid ambiguity problems and attain a greater level margin between sampling points in a bit period following an occupied bit period (such as a sequence of 1,0,1,0,etc.); and, (4) the incorporation of a sequential logic subsystem that provides recognition of the synchronization pulses in order to initiate sequential sampling during the location identification coding bit sequence. Decoders that incorporate these features are illustrated in FIGS. 7 and 9, and are hereinafter described.

Figure 7:
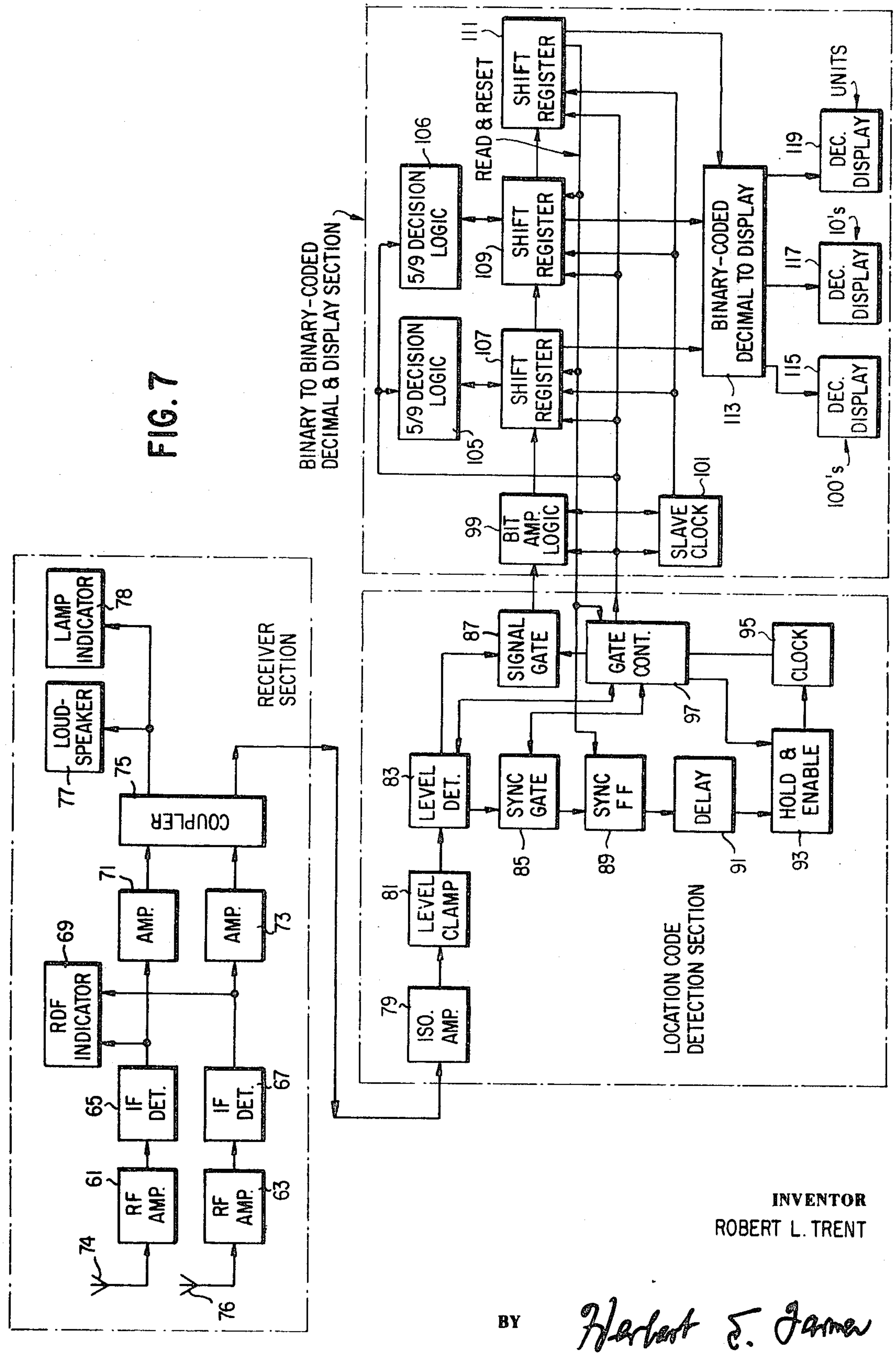
FIG. 7 is a block diagram of an alternative embodiment of a receiver made in accordance with the invention.

FIG. 7 illustrates: a receiver section; a location code detection section; and, a binary to binary-coded decimal and display section. The receiver section illustrated in FIG. 7 comprises: first and second RF amplifiers 61 and 63; first and second IF detectors 65 and 67; a radio direction finder (RDF) indicator 69; first and second amplifiers 71 and 73; a coupler 75; a loud speaker 77; and an indicating lamp (78). Also illustrated in FIG. 7 are first and second radio direction finding antennas 74 and 76.

The output of the first radio direction finding antenna 74 is connected through the first RF amplifier 61 to the input of the first IF detector 65. The output of the first IF detector 65 is connected to one input of the RDF indicator 69. The output of the second radio direction finding antenna 76 is connected through the second RF amplifier 63 to the input of the second IF detector 67. The output of the second IF detector is connected to a second input of the RDF indicator 69. It will be appreciated by those skilled in the art that the RDF indicator, because it has two radio direction finding input signals, will provide an indication of the general direction of a tone generating transmitter from an aircraft carrying a receiver of the type illustrated in FIG. 7, in accordance with well known principles.

The output of the first IF detector 65 is also connected through the first amplifier 71 to one input of the coupler 75. The output of the second IF detector 67 is connected through the second amplifier 73 to a second input of the coupler 75. The coupler 75 is designed to couple these two input signals to its two outputs in a summation manner i.e. the inputs are summed at each output to intensify the outputs. One output of the coupler 75 is connected to the loud speaker 77 to generate a low frequency audio tone signal of the type heretofore described, and simultaneously to light the indicating lamp 78, to warn the receiver operator that a transmitter has been activated. As previously stated, the loud speaker 77 can be replaced by an earphone or a pair of earphones.

The location code indentification section illustrated in FIG. 7 comprises: an isolating amplifier 79; a level clamping circuit 81; a level detecting circuit 83; a synchronizing gate 85; a signal gate 87; a synchronous flip-flop 89; a delay 91; a hold and enable circuit 93; a clock 95; and, a gate control circuit 97.

The second output from the coupler 75 is connected through the isolating amplifier 79 to the input of the level clamping circuit 81. The level clamping circuit 81 clamps the input signal to a maximum level for ease of detection. Preferably, this maximum level is 80 percent of the maximum output level of the receiver sub-systems connected to the input of the level clamping circuit 81.

The level clamping circuit 81 is connected to the level detecting circuit 83 so that the level detecting circuit can sample the voltage clamped by the level clamping circuit at predetermined intervals in the manner hereinafter described.

One output of the level detecting circuit 83 is connected to the signal input of the synchronizing gate 85. A second output of the level detecting circuit is connected to the signal input of the signal gate 87. The output of the synchronizing gate is connected to the input of the synchronizing flip-flop 89. The output of the synchronizing flip-flop 89 is connected through the delay circuit 91 to the signal input of the hold and enable circuit 93. The output of the hold and enable circuit is connected to the control input of the clock 95. The pulse output of the clock 95 is connected to the input of the gate control circuit 97.

The gate control circuit generates five output control signals, one of which is connected to a control input of the level detecting circuit 83 and another of which is connected to the inhibit input of the signal gate 87. The third output of the gate control circuit is connected to the control (hold) input of the hold and enable circuit 93, a fourth output of the gate control circuit is connected to subsections of the binary to binary-coded decimal and display section as hereinafter described. The fifth output of the gate control circuit controls the operation of the sync flip-flop 89, thru the sync gate 85. The output of the signal gate 87 is connected to a decoupling bit amplifier 99 forming a part of the binary to binary-coded-decimal logic section. The remaining interconnections between the location code detection section of the binary to binary-coded-decimal section consist of a master clock signal passed by means of the gate control circuit 97 (output four), and a reset pulse lead from the last shift register (least significant digits) 111 of the binary to binary-coded decimal section to the sync flip-flop 89.

Turning now to a description of the operation of the code detection section of the system illustrated in FIG. 7, the sub-audio location identification signals (both continuous tone and binary code) are passed by the isolating amplifier 79 and applied to the level clamping circuit 81. The level clamping circuit 81 clamps the ON (1) portions of the identification signal to a maximum level following a build-up curve of the type illustrated in FIG. 5. This maximum level is set somewhat below the 100 percent maximum rated audio level output of the receiver, 80 percent, for example. The level clamping circuit also incorporates suitable, well known circuitry to decouple the decaying portion of the ON signals from the normal receiver characteristics. That is, as soon as an ON or 1 pulse starts to decay below the maximum level, the decay is decoupled from the level clamping portion of the circuit. Thereafter, the level clamping circuit provides an internal decay that is approximately an order of magnitude faster than the normal decay. Because of this faster decay, the hereinafter described level detection has reduced chance for ambiguity of detection during the decaying portion of the signal.

The output of the level clamping circuit 81 is sampled by the level detecting circuit 83. The level detecting circuit 83 is normally ON or activated for continuous sampling, but is capable of fast response under the direction of the gate control circuit 97, as hereinafter described. The synchronizing flip-flop 89 is set in an initial state. This initial state setting occurs either upon the application of power to the receiver or, at later times, by a reset pulse from the last shift register 111 which occurs each time a complete location code sequence has been received.

In accordance with the results of its sampling, the level detector applies pulses to the synchronizing flip-flop. When the level detector has sampled a sequence of tone bursts that correspond to an OFF-ON-OFF-ON sequence, the synchronizing flip-flop applies a pulse to the delay circuit. The first or OFF condition exists when no signal has been received, the second or ON condition exists when a code identification tone burst is sent upon activation of a transmitter. The third or OFF signal occurs when the code identification tone burst is turned off prior to the occurrence of a sync tone burst, which is the fourth or ON condition.

The synchronizing flip-flop pulse, after being delayed by the delay circuit 91 is applied to the hold and enable circuit 93. For the 250 mS signal example previously described, preferably, the delay circuit provides a delay of approximately 75 mS.

The hold and enable circuit 93 starts the clock 95 running when it receives the delayed pulse. The clock runs at the same frequency as the sub-audio pulse repetition rate (250 mS), its initial signal output pulse will occur approximately 250 mS after the delayed pulse is impressed. Any significant delays involved in the starting of the clock are made up by adjustment of the nominal 75 mS delay.

The pulses from the clock 95 operate the gate control circuit 97. The gate control circuit 97 applies a resample pulse to the level detector 83 at time 250+75 mS. This time point is 75 mS after the assumed mid-level point of the rising front of the sync pulse which initially caused the sync flip-flop pulse to start the clock. If upon the occurrence of this resampling the level of the signal is still above the 50 percent point, the sync pulse is uniquely present.

From this recognition point throughout the remainder of the code interval, the level detector 83 samples under the control of the gate control 97 at 250 mS intervals (which are now 75 mS after mid point).

Following the recognition point, the gate control circuit 97 inhibits further pulse passage through synchronizing gate 85. Thereafter, the level detector passes ON (1) and OFF (0) pulses through the signal gate 87 to the bit amplifier 99 in accordance with whether or not a pulse exists at the level clamping circuit 81 each time it is sampled by the level detector. Similarly the master clock pulses from clock 95 are passed sequentially every 250 mS to the binary to binary-coded decimal and display section.

As illustrated in FIG. 2, after the first two sync bits have arrived, a three bit dead space occurs. These three zeros are fed to the bit amplifier logic circuit 99 and are followed by the most significant bit levels. In a similar fashion, the remaining six bits of the code interval are sampled every 250 mS. Depending upon whether or not the level detecting circuit 83 indicates that a one or a zero is present, that information is applied to the bit amplifier logic circuit 99.

The following description covers the logical operational sequence incorporated to convert the sampled bit information corresponding to the transmitted binary word to an equivalent binary-coded-decimal word capable of providing a three decimal digit display. The technique employed is based upon the standard "Couleur" encoding method for converting a binary input sequence of bits into a binary-coded-decimal code, for display purposes.

The binary-to-binary-coded decimal and display section comprises: the bit amplifier logic circuit 99; a slave clock 101; two 5/9 decision logic circuits 105 and 106; three shift registers 107, 109 and 111; a binary-coded decimal to display coupling circuit 113; and, three decimal display elements 115, 117 and 119.

The bit amplifier logic circuit 99 incorporates flip-flops and gating logic, operating to ensure that the first three zeros, (dead period), which follow the synchronizing burst of two bit periods, are not passed to the shift register 107. The slave clock 101 is actuated by the bit amplifier logic 99 so that in each subsequent 250 mS period, the slave clock provides a sequence of control pulses to the three shift registers at a much faster rate, for example 1,000 pulses per second.

The basic conversion circuitry comprises the three shift registers 107, 109 and 111 which are connected in series to the output of the bit amplifier logic circuit 99. The output of each register is capable of forming a binary-coded-decimal code with: the third shift register 111 forming the 100's digit code (only one of which is required, since the maximum code format corresponds to a number 127); the second shift register 109; forming the 10's digit code; and, the first shift register 107 forming the unit's (0–9) digit code.

Associated with the first and second shift reigsters 107 and 109 are the two 5/9 decision logic circuits 105 and 106. Under the conversion technique as taught by Couleur, the binary code digits are stepped sequentially into the first shift register 107, the most significant digit element of the code first. After each code element has been entered into the first shift register 107, the binary word present in that register is sampled prior to the passage of the next code element. If the code sampled corresponds to a binary word weighting between 0 and 4, no further interbit action occurs. If the code sampled corresponds to a binary word weighting between 5 and 9, that code is shifted to the associated 5/9 decision logic circuit 105, a binary 3 is added to that code, and the resulting binary word is reshifted back to shift register 107.

In accordance with normal digital logic procedures, as soon as the capacity of the first shift register 107 is exceeded, an output pulse is fed to the second shift register 109, where the aforementioned sampling, shifting, adding a binary 3 if the binary weighting present in the second shift register lies between the limits of 5 and 9, and reregistering operations are carried out. Since it is known that the third shift register 111 will be required to register a maximum of only one binary-coded-decimal bit, corresponding to location code weightings between 100 and 127, the remaining register stages of the third register are used to monitor the number of location code elements appearing at the conversion section of the receiver. As soon as this number attains the value of 7, a read and reset pulse is generated.

The read and reset pulse is used to perform two functions. One is to cause the binary-decimal codes registered in the three shift registers 107, 109 and 111 to be transferred through the binary-coded-decimal display circuit 113 to the decimal display elements 115, 117 and 119, respectively, simultaneously setting all shift registers 107, 109 and 111 to zero. The other function is to disable the location code detection section and place it into a readiness mode, awaiting the arrival of the next sequentially-following location identification code. The binary-coded-decimal to display circuit 113 is arranged to maintain the last received location code on display until the arrival of either the same code resulting from the next sequentially following location code from the same transmitter, or a new code from another transmitting location.

The following description describes the detailed actions occurring in the location-code detection section, assuming that a reset pulse, provided by the third shift register 111 has been fed back. The reset pulse is passed by gate control 97 to the hold and enable circuit 93, which turns off the master clock 95; in addition synchronizing gate 85 is returned to its ON condition, and synchronizing flip-flop 89 is reset, in readiness to recognize the OFF-ON-OFF-ON sequence of tone bursts, as it was prior to receiving the initial location code sequence.

The display may take on various forms. For example, it may comprise a cathode-ray tube binary display, or alternatively, a set of seven-segment luminescent semiconductor digital display components. If desired, a signal may be applied to the display to disable it and thereby indicate that a new sequence is to arrive, when a following sync tone burst has been recognized.

Figure 8:
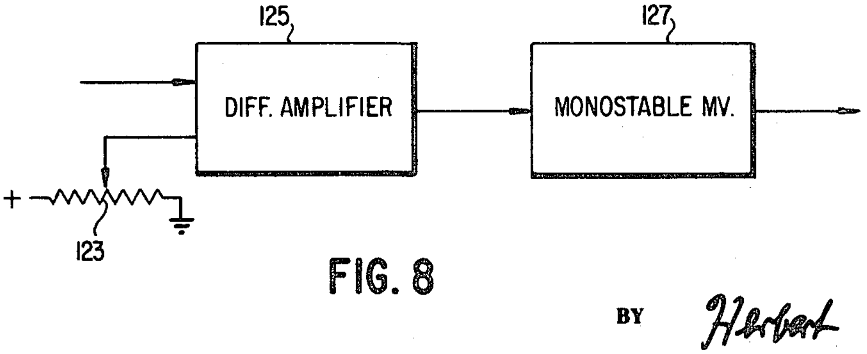
FIG. 8 is a variation of a portion of the receiver illustrated in FIG. 7.

While the foregoing system provides an uncomplicated means for determining the presence or absence of pulses of a sub-audio frequency, the possibility of pulse ambiguity still exists, even though only remotely. An alternate approach to the problem of level clamping and faster rise and fall time of the response is illustrated in FIG. 8. This modification renders the sampling problem a simple decision between OFF and ON states of a flip-flop and may eliminate the linear problem of modifying the exponential decay response. More specifically, the modification illustrated in FIG. 8 does not necessarily require a level clamp 81 of the type shown in FIG. 7. Instead of the output of the isolating amplifier 79 is connected to a simple maximum level clipping circuit which provides one input of a differential amplifier 125. The second input to the differential amplifier is derived from one arm of a potentiometer 123, that has been adjusted to a predetermined, fixed voltage level; this level is also controlled by the condition of a flip-flop 129 (FIG. 9), whose action will be described in a later section. The circuit operation of this novel alternative location-code detection method, however, will be described in terms of FIG. 7.

The output of the differential amplifier 125 is connected to the input of the monostable multivibrator 127. The output of this multivibrator provides the input to the level detecting circuit 83. In operation, the clamped input signal impressed on one input of the differential amplifier is compared to the reference voltage provided by the potentiometer 123, which as been set, for a given condition of the flip-flop 129, at, for example, 55 percent of the rated maximum unclamped output of the receiving section. If the signal level exceeds 55 percent, the resulting output of the differential amplifier triggers the monostable multivibrator 127. The ON period of the monostable multivibrator is temperature-compensated, and adjusted to be 244± 5 mS in duration. The output of the multivibrator thus provides an ideal sampling level input, because it is unambiguously ON or OFF. Moreover, the response times of both the differential amplifier and the multivibrator may normally be expected to be in the order of nanoseconds, or at most microseconds. Hence, in the event that the multivibrator turns OFF at the end of its monostable ON period, it will be returned to its ON condition by the action of the differential amplifier, assuming that the signal level at the input to the differential amplifier is above the 55 percent level, long before any sampling reoccurs. A comparison of the improvement achieved in detection margins between this alternative time-switched mode of level detection, and the previous amplitude detection method is shown on FIG. 10A and 10B. These figures illustrate the two limiting cases which would be encountered in system operation.

Figure 10A:
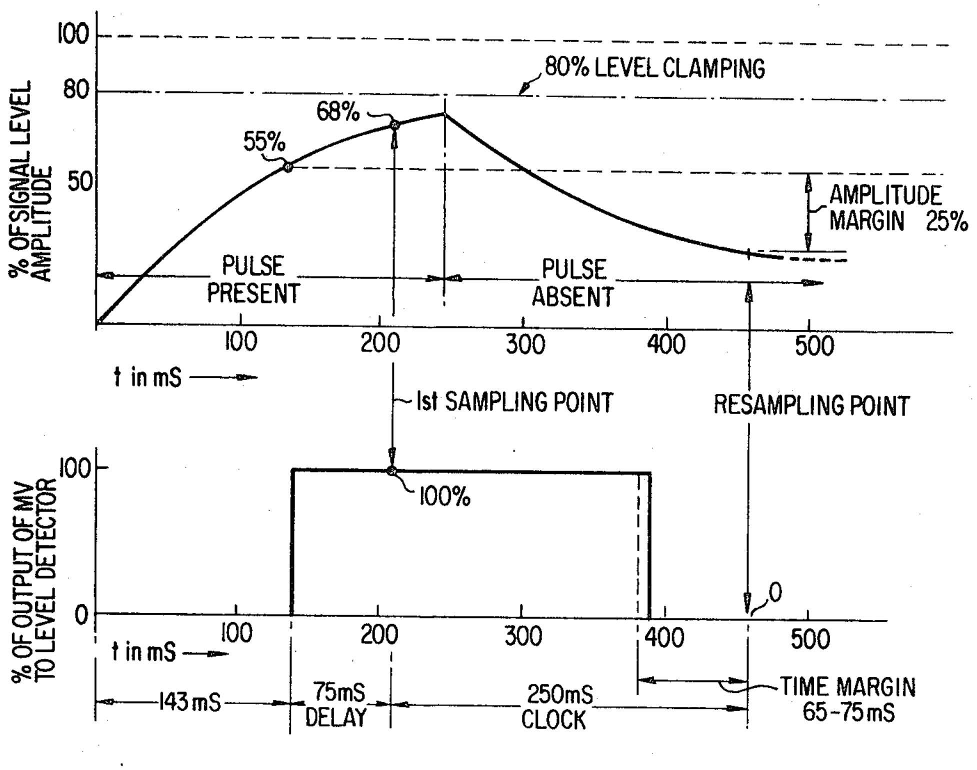

The first case, illustrated in FIG. 10A, indicates the level detection problem when the system has been alerted so that a location code is being received, and following a sequence of blank spaces, a single pulse is present, that pulse being followed by another blank space. In this case, as illustrated in the upper portion of FIG. 10A, the signal output of the receiver will rise exponentially, and will achieve an amplitude of 75 percent of maximum, at the end of the pulse time slot, or bit period. Thus, the level clamp, presumed to be set to limit the amplitude at 80 percent of maximum, will never act to clamp the output. At the end of the pulse-present bit period, at which time the signal level will decay exponentially, it is desired to determine the amplitude of the signal at the time the clocking pulse causes resampling to occur. The upper figure illustrates that the change in signal amplitude between the "detection level" of 55 percent, and the new signal level will be approximately 25 percent. In the lower figure, it is seen that the output of the multivibrator, controlled by the differential amplifier, is switched between 100 percent output level and zero. Thus, at the time of sampling for detection of the presence of a pulse the amplitude in the upper figure will be approximately 68 percent of maximum level, unclamped, whereas in the lower figure, the amplitude of the signal impressed on the level detector will be 100 percent of the output of the multivibrator. In the following time slot, when no pulse is present, the amplitude of the signal impressed on the level detector by the multivibrator will be an unambiguous zero, with a time margin of between 65–75 mS.

Figure 10B:
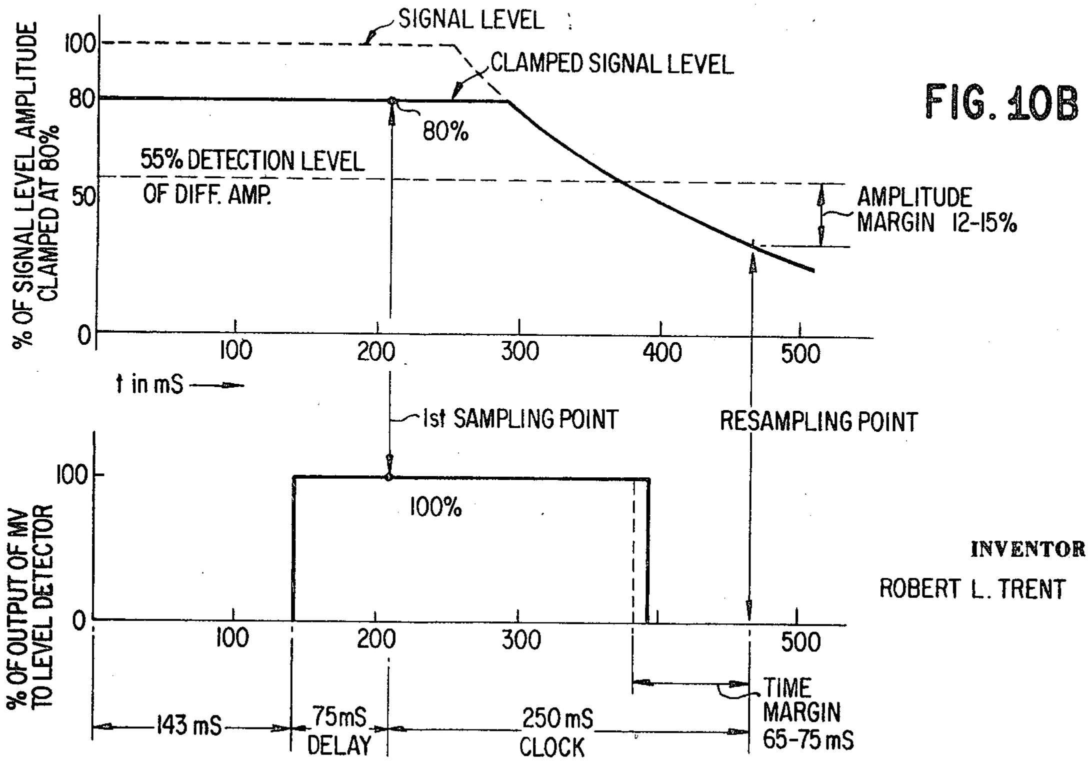

FIG. 10B illustrates the second case; that is, the level detection problem when the system has been alerted so that a location code is being received, and following a sequence of pulses, a blank space occurs. In this case, the signal level of the receiver will be at 100 percent, and the level clamp will have set the level at 80 percent of maximum. In the amplitude detection case, the receiver output level will decrease exponentially as soon as the pulse period, where a blank space is present, begins. At the time of resampling, the level at the input of the level detector would have decayed to approximately 42 percent of its maximum level, providing an amplitude margin between the 55 percent detection level and the new value of approximately 12–15 percent. In the lower figure, it is seen that the amplitude level at the time of first sampling for the presence of a pulse, the amplitude is again 100 percent, and at the time of resampling during the absence of a pulse, the level is zero. The time margin of 65–75 mS is identical with that of the fist case.

It will be appreciated by those skilled in the art that the modification illustrated in FIGS. 8, 9 and 10 accomplishes a basic objective of the invention — the provision of an unambiguous sampling level, either ON or OFF. That is, there is no long exponential rise or trailing exponential decay to present the level detecting circuit with decision ambiguities. In other words, the level detecting circuit now samples a square wave as opposed to an exponentially rising and falling wave of the type illustrated in FIGS. 5 and 6. As shown, the 75 mS delay may still be used to allow sampling in the manner previously described. Moreover, if desired, this delay can be increased to, 100 mS, for example, thereby providing a further increase in margin (on a time basis). In other words, the system illustrated in FIG. 8 not only increases the reliability of the system by changing the signal from an increasing and decreasing signal to an unambiguous square wave signal, it also increases reliability by allowing sampling at a later point in the wave.

FIG. 9 illustrates an alternative embodiment of a decoder and location code detection section formed in accordance with the invention for decoding pulse-code modulated subaudio (low frequency) location signals. The decoding section illustrated in FIG. 9 comprises: the isolating amplifier 79; the level clamping circuit 81; the level detecting circuit 83; the sync gate 85; the signal gate 87; the sync flip-flop 89; the hold and enable circuit 93; the clock 95; the gate control circuit 97; the differential amplifier 125; the detection-level setting potentiometer 123; a means for enabling and disabling the level-setting feature, designated the control flip-flop 129; the monostable multivibrator 127, whose output is applied to the level detecting circuit 83; and, two delay circuits, the first delay circuit 135 having a delay of 75 mS, and the second delay circuit 131 having a delay of approximately 10 mS. All of the circuit elements are similar to those described in FIGS. 7 and 8, with the exception that the first delay circuit 135 (75 mS) performs a function similar to that of delay circuit 91 of FIG. 7.

One input of the differential amplifier 125 is connected to receive the CTCSS signal, thru level clamping circuit 81. The potentiometer 123 is connected between positive and negative voltage sources designated +V and −V respectively. The wiper arm of the potentiometer is connected to the other input of the differential amplifier 125. A tap on the potentiometer 123 is connected to an output terminal of the control flip-flop 129. The potentials present at the output of the control flip-flop are adjusted so that when the flip-flop is in the ON condition, the wiper arm of the potentiometer can be adjusted so that the potential impressed on the input to the differential amplifier can be adjusted to be equal to 55 percent of the maximum signal level impressed on the level clamp 81. Conversely, when the control flip-flop 129 is in it's OFF condition, the voltage impressed on the input to the differential amplifier will be greater than the signal level, thus disabling the differential amplifier.

The sequence of operation of the various circuit elements will now be described. It is assumed that initially the control flip-flop has been set to its ON condition, so that differential amplifier 125 is enabled. Referring to FIG. 10A, it is assumed that a pulse is present, and that the signal level is rising exponentially. As soon as the level attains 55 percent of maximum, the differential amplifier triggers the monostable multivibrator 127, and it begins its ON period of 225 mS. The rising wavefront of the output of the monostable multivibrator is passed simultaneously to the two delay circuits 131 and 135. The signal is delayed by approximately 10 mS by the second delay circuit 131 before it turns the control flip-flop 129 OFF, thus disabling the differential amplifier 125.

The signal delayed by 75 mS thru the first delay 135 is passed to the gate control circuit 97. This circuit causes the level detector 83 to sample the output of the monostable multivibrator. Since at this point in time the monostable multivibrator is ON, that information is passed thru the sync gate 85 and an isolating element 137 to the synchronizing flip-flop 89. The output of the sync flip-flop 89 energizes the hold and enable circuit 93, starting the clock 95. 250 mS later, the first clock pulse is passed to the gate control circuit. The gate control circuit passes a pulse to the control flip-flop 129, enabling the differential amplifier 125 to resample the input level, and shortly thereafter causes the level detector to resample the output of the monostable multivibrator 127.

If it is assumed that the input level has followed the waveform shown in FIG. 10A, its level will be below 55 percent, and the monostable multivibrator will not have been retriggered to ON. On this resampling therefore, the gate control 97, reflecting the OFF level of the monostable multivibrator, will turn the hold and enable circuit 93 OFF, thus stopping the clock. Similarly, the gate control circuit 97 will remove the disabling control signal on the 75 mS delay circuit 135, in readiness for recognition of the next tone burst.

It should be mentioned that the same condition for recognition of a sequence of tone bursts corresponding to OFF-ON-OFF-ON as prescribed for the sync flip-flop 89 when considering FIG. 7 holds in FIG. 9. The following description describes the operation of the alternate location code detection section shown in FIG. 9, under the assumptions that an OFF-ON-OFF-ON sequence of tone bursts has already been detected, that the sync flip-flop 89 has therefore been notified that there is the possibility that the last previous tone burst, or pulse was the first pulse of a synchronizing sequence of two successive pulses.

The sequence of circuit operation is exactly the same as that previously described, except that when the differential amplifier 125 is caused to resample the input level, that level, since a second sync pulse is present, will be above 55 percent of maximum amplitude and the monostable multivibrator 127 will be retriggered to ON. Thus, when the gate control 97 informs the level detector 83 to resample the output of the monostable multivibrator, the level detector will again see an ON condition. Thus the sync flip-flop will maintain an enabled condition on the hold and enable circuit 93, which in turn maintains the master clock in operation. The gate control 97 therefore causes gate 87 to be enabled, and the following sequence of pulses corresponding to pulse intervals six through 12 inclusive, will be passed to the binary to binary-coded-decimal and display section, in a fashion analogous to that discussed when describing FIG. 7.

It will be appreciated by those skilled in the art and others that the invention provides a novel identification location system. While the invention can use sophisticated and complex equipment operating on a multitude of frequency bands, it preferably uses continuous tone-controlled squelch system receivers and transmitters which are readily commercially available. A slight modification of these transmitters and recievers allows them to be used to transmit location identification information.

While preferred embodiments of the invention have been described, it will be appreciated that various changes can be made therein without departing from the scope of the invention. For example, if desired, the audio-oscillator 13 (which is a sub-oscillator in the preferred sub-audio embodiments) may be inhibited by a gate when a location identification signal is to be transmitted. Such inhibiting may be mandatory if the frequency of the audio oscillator is near the pulse frequency of the location identification signal. Moreover, various control systems other than those described herein can be utilized with the invention. Further, one of the transmitters can be activated at predetermined spaced intervals, thereby acting as a control station, so that the operation of the receiver can be continuously checked out. Hence, the invention can be practiced otherwise than as specifically described herein.

What is claimed is:

1. A carrier wave transmitter providing a signal for transmitter identification comprising a. a source of constant frequency, continuous tones, said constant frequency being much less than a carrier wave frequency of the transmitter, b. means for gating the tones to carrier frequency transmitting means, said gating means including:

i. means for sequentially passing and blocking the tones in response to an indication of the transmitter identification, to provide a coded signal including a predetermined number of sequential, equal duration, binary identification bits, ii. means for blocking the tones for predetermined time intervals on each side of the first and last identification bits, each of said predetermined intervals being an integral multiple of the interval required for each identification bit to provide dead spaces having durations of a predetermined number of said identification bits before and after each occurrence of the coded signal, and iii. means for passing the tones for a predetermined time period before the occurrences of the dead space preceding the coded signal, each of said predetermined time periods being an integral multiple of the interval required for each identification bit to provide a synchronization signal.

2. The transmitter of claim 1 further including means for transmitting modulated carrier tones as binary bits having rise and fall times between changes of binary levels that are susceptible to durations as long as the time interval of the bits.

3. A location identification system comprising:

1. a plurality of spaced transmitters, each of said transmitters including:

a. a source of constant frequency, continuous tones, said constant frequency being much less than a carrier frequency of the transmitter, b. means for gating the tones to carrier frequency transmitting means, said gating means including:

i. means for sequentially passing and blocking the tones in response to an indication of the transmitter identification to provide a coded signal including a predetermined number of sequential, equal duration, binary identification bits, ii. means for blocking the tones for predetermined time intervals on each side of the first and last identification bits, each of said predetermined intervals being an integral multiple of the interval required for each identification bit to provide dead spaces having durations of a predetermined number of said identification bits before and after each occurrence of the coded signal, and iii. means for passing the tones for a predetermined time period before the occurrences of the dead space preceding the coded signal, each of said predetermined time periods being an integral multiple of the interval required for each identification bit to provide a synchronization signal, 2. a receiver responsive to the carrier waves transmitted from the plural transmitters, said receiver including:

a. means responsive to the synchronization signals, dead space and coded signals for separating the coded signals from the synchronization signals and dead space, and b. means responsive to the separating means for decoding the separated coded signal.

4. A location a location identification system as claimed in claim 3 wherein said source of tones comprises a radio frequency oscillator, an audio oscillator and a modulator, the outputs from said radio frequency oscillator and said audio oscillator being connected to the inputs of said modulator to derive a modulated signal, and means for applying the modulated signal to the means for gating.

5. A location identification system as claimed in claim 4 wherein said tone passing and blocking means comprises a shift register and a control gate, the output from said shift register being applied to the input of said control gate.

6. A location identification system comprising:

1. a plurality of transmitters, each of said transmitters including:

a. a tone means for generating a continuous tone signal;

b. a transmitting means connected to said tone means for transmitting said continuous tone signal;

c. coding means for generating a binary location identification code; and, d. gating means connected to the said transmitting means and to said coding means for interrupting the transmission of said continuous tone signal at spaced intervals and for applying said binary location identification code to said transmitting means so that a location identification is transmitted during said spaced intervals; and, 2. a receiver for receiving said continuous tone and said binary code location identification signals, said receiver including:

a. receiving means for receiving the continuous tone and binary location identification code signals transmitted by said transmitting means; and, b. decoding means connected to said receiving means for decoding the binary location code identification portion of the received signals, said tone means comprising a radio frequency oscillator, an audio oscillator and a modulator, the outputs from said radio frequency oscillator and said audio oscillator being connected to the inputs of said modulator so that said modulator generates the continuous tone signal that is applied to said transmitting means, said coding means comprising a shift register and a control gate, the output from said shift register being applied to the input of said control gate, said control gate being connected to said transmission means to inhibit the passage of said continuous tone signal and enable the passage of a signal corresponding to the binary code output of said shift register upon the application of suitable control signal to said control gate, said coding means also comprising a delay circuit and a timer circuit, said shift register being connected to said delay circuit so as to apply a control pulse to said delay circuit, the output of said delay circuit being connected through said timer circuit to the control input of said control gate whereby after a predetermined time interval a control signal is applied to said control gate to allow said control gate to pass the output of said shift register.

7. A location identification system as claimed in claim 6 wherein said transmitting means includes a preamplifier, a signal gate, and a power amplifier, the output of said modulator being connected to the input of said preamplifier, the output of said preamplifier being connected to the signal input of said gate and the output of said gate being applied to the input of said power amplifier, the output of said control gate being connected to the control inputs of said signal gate to inhibit or enable the passage of the continuous tone signal being generated by said modulator.

8. A location identification system as claimed in claim 7 wherein said continuous tone and said location identification binary code signals are a sub-audio frequency signals.

9. A receiver for constant time interval binary bits having rise and fall times between changes of binary levels that are susceptible to durations as long as the time intervals of the bits, said bits including sequential binary one levels forming a synchronizing signal followed by an information signal including a plurality of sequential, coded binary bits, one binary one bit following immediately after another binary one bit in the synchronizing signal, comprising a gate for passing the synchronizing signal, means responsive to a received signal passed by the gate for recognizing the binary one synchronizing signal in response to the amplitude of the received signal exceeding a predetermined level for more than one bit interval, means responsive to the recognizing means for closing the gate a predetermined time interval after the synchronizing signal has been recognized, said predetermined time interval being less than the rise time required for a bit to change between binary levels, and means for periodically sampling the sequential bits until all of the bits for a particular information signal have occurred, said means for sampling being responsive to the received signal at times following closing of the gate equal to integral multiples of the bit time interval, the number of samples being equal to the number of bits for a particular information signal.

10. A location identification system comprising:

1 a plurality of transmitters, each of said transmitters including:
   a. a tone means for generating a continuous tone signal;
   b. a transmitting means connected to said tone means for transmitting said continuous tone signal;
   c. coding means for generating a binary location identification code, said coding means comprising a shift register for deriving a sequence of binary output bits and a control gate, the output bits from said shift register being applied in sequence to an input of said control gate, said control gate being connected to said transmitting means to inhibit the passage of said continuous tone signal and enable the passage of a signal corresponding to the binary code output of said shift register upon the application of suitable control signal to said control gate; and,
   d. gating means connected to the said transmitting means and to said coding means for interrupting the transmission of said continuous tone signal at spaced intervals and for applying said binary location identification code to said transmitting means so that a location identification is transmitted during said spaced intervals;

2. a receiver for receiving said continuous tone and said binary code location identification signals, said receiver including:
   a. receiving means for receiving the continuous tone and binary location identification code signals transmitted by said transmitting means; and,
   b. decoding means connected to said receiving means for decoding the binary location code identification portion of the received signals, said decoding means comprising:
      i. a level detector having its input connected to the output of said receiving means;
      ii. a time delay circuit responsive to the level detector; and,
      iii. a binary storage means having its input connected to the output of said time delay circuit for storing said location identification binary code; and 3. a display means connected to the output of said binary storage means for displaying the location identification binary code stored by said binary storage means;

said decoding means further including:
   a level clamping circuit connected between said receiving means and said level detector;
   a synchronizing gate having signal and control inputs, the signal input being connected to the output of said level detector;
   a synchronizing flip-flop having its set input connected to the output of said synchronizing gate;
   a delay circuit having its input connected to the output of said synchronizing flip-flop;
   a hold and enable circuit having signal and control inputs, the signal input being connected to the output of said delay circuit;
   a clock having its trigger input connected to the output of said hold and enable circuit;
   a gate control circuit having its input connected to the output of said clock and having a plurality of control outputs, one of said control outputs being connected to a control input of said level detector, a second control output being connected to the control input of said hold and enable circuit, a third control output being connected to the control input of said ring counter, and a fourth control output being connected to said synchronizing gate; and,
   a signal gate having a signal input connected to the output of said gate control circuit and a control input connected to an output of said gate control circuit and an output connected to the input of said binary storage means.

11. A location identification system as claimed in claim 10 including:
   a differential amplifier having one input connecting the output of said level clamping circuit;
   a potentiometer connected between voltage sources of opposite polarity and having its wiper arm connected to the second input of said differential amplifier; and,
   a monostable flip-flop having its input connected to the output of said differential amplifier and its output connected to the input of said level detector.

12. A location identification system as claimed in claim 10 wherein said binary storage means comprises:
   a bit amplifier and logic circuit having its signal input connected to the output of said signal gate and a control input connected to an output of said gate control circuit;
   a first shift register having its signal input connected to the output of said bit amplifier and logic circuit and its control input connected to an output of said gate control circuit;
   a first 5/9 decision logic circuit having its control input connected to an output of said gate control circuit and having its control output connected to said first shift register;
   a second shift register having its signal input connected to the output of said first shift register and its control input connected to the output of said gate control circuit;

a second 5/9 decision logic circuit having its control input connected to an output of said gate control circuit and its control output connected to said second shift register;

a third shift register having its signal input connected to the output of said second shift register and having its control input connected to an output of said gate control circuit, the output of a predetermined stage of said third shift register being connected to the reset inputs of said synchronous flip-flop; and gate control circuit and said first and second shift registers;

a slave clock circuit having its control input connected to an output of said gate control circuit and having its clock output connected to the clock inputs of said first, second and third shift registers, said slave clock also being connected to said bit amplifier and logic circuit; and, a binary-coded decimal to display circuit having its signal inputs connected to the signal outputs of said first, second and third shift registers.

13. A location identification system as claimed in claim 12 wherein said display means is formed of first, second and third decimal display devices separately connected to outputs of said binary-coded decimal to display circuit.

14. A location identification system comprising:

1. a plurality of transmitters, each of said transmitters including:
   a. a tone means for generating a continuous tone signal;
   b. a transmitting means connected to said tone means for transmitting said continuous tone signal;
   c. coding means for generating a binary location identification code, said coding means comprising a shift register for deriving a sequence of binary output bits and a control gate, the output bits from said shift register being applied in sequence to an input of said control gate, said control gate being connected to said transmitting means to inhibit the passage of said continuous tone signal and enable the passage of a signal corresponding to the binary code output of said shift register upon the application of suitable control signal to said control gate; and,
   d. gating means connected to the said transmitting means and to said coding means for interrupting the transmission of said continuous tone signal at spaced intervals and for applying said binary location identification code to said transmitting means so that a location identification is transmitted during said spaced intervals;
2. a receiver for receiving said continuous tone and said binary code location identification signals, said receiver including:
   a. receiving means for receiving the continuous tone and binary location identification code signals transmitted by said transmitting means; and,
   b. decoding means connected to said receiving means for decoding the binary location code identification portion of the received signals, said decoding means comprising:
      i. a level detector having its input connected to the output of said receiving means;
      ii. a time delay circuit responsive to the level detector; and,
      iii. a binary storage means having its input connected to the output of said time delay circuit for storing said location identification binary code; and
3. a display means connected to the output of said binary storage means for displaying the location identification binary code stored by said binary storage means;

said decoding means further including:

a level clamping circuit connected to the output of said receiving means;

a differential amplifier having one input connected to the output of said level clamping circuit;

a monostable multivibrator having its input connected to the output of said differential amplifier and its output connected to the input of said level detector;

first and second delay circuits having their inputs connected to an output of said monostable multivibrator;

a control flip-flop having its reset input connected to the output of said first delay circuit;

a potentiometer connected across voltage sources of opposite polarity and having its center tap connected to the output of said control flip-flop, the wiper arm of said potentiometer being connected to the second input of said differential amplifier;

a gate control circuit having an input connected to the output of said second delay circuit, said gate control circuit having a plurality of outputs one of said control outputs being connected to a disable input of said second delay circuit, a second control output being connected to said level detector, a third control output being connected to the set input of said control flip-flop;

a signal gate having its signal input connected to the output of said level detector and its control input connected to a further control output of said gate control circuit;

a synchronizing gate having its signal input connected to the output of said level detector;

a synchronizing flip-flop having its set input connected to the output of said synchronizing gate;

a hold and enable circuit having signal and control inputs, the signal input being connected to the output of said synchronizing gate and the control input being connected to an output of said gate control circuit; and a clock having its control input connected to the output of said hold and enable circuit and its signal output connected to said gate control circuit.

15. A location identification system as claimed in claim 14 wherein said binary storage means comprises:

a bit amplifier and logic circuit having its signal input connected to the output of said signal gate and a control input connected to an output of said gate control circuit;

a first shift register having its signal input connected to the output of said bit amplifier and logic circuit and its control input connected to an output of said gate control circuit;

a first 5/9 decision logic circuit having its control input connected to an output of said gate control circuit and having its control output connected to said first shift register;

a second shift register having its signal input connected to the output of said first shift register and its control input connected to the output of said gate control circuit;

a second 5/9 decision logic circuit having its control input connected to an output of said gate control circuit and its control output connected to said second shift register;

a third shift register having its signal input connected to the output of said second shift register and having its control input connected to an output of said gate control circuit, the output of a predetermined stage of said third shift register being connected to the reset inputs of said synchronous flip-flop, said gate control circuit and said first and second shift registers;

a slave clock circuit having its control input connected to an output of said gate control circuit and having its clock output connected to the clock inputs of said first, second and third shift registers, said slave clock also being connected to said bit amplifier and logic circuit; and, a binary-coded decimal to display circuit having its signal inputs connected to the signal outputs of said first, second and third shift registers.

16. A location identification system as claimed in claim 15 wherein said display means is formed of first, second and third decimal display devices separately connected to the output of said binary-coded decimal to display circuit.

17. A transmitter suitable for use in a continuous tone controlled location identification system comprising:
a tone means for generating a continuous tone signal;
a transmitting means connected to said tone means for transmitting said continuous tone signal;
coding means for generating a binary location identification code; and,
gating means connected to the said transmitting means and to said coding means for interrupting the transmission of said continuous tone signal at spaced intervals and for applying said binary location identification code to said transmitting means so that a location identification code is transmitted during said spaced intervals,
said tone means comprising a radio frequency oscillator, an audio oscillator and a modulator, the outputs from said radio frequency oscillator and said audio oscillator being connected to the inputs of said modulator so that said modulator generates the continuous tone signal that is applied to said transmitting means,
said coding means comprising a shift register and a control gate, the output from said shift register being applied to the input of said control gate, said control gate being connected to said transmission means to inhibit the passage of said continuous tone signal and enable the passage of a signal corresponding to the binary output of said shift register upon the application of suitable control signal to said control gate, said coding means also comprising a delay circuit and a timer circuit, said shift register being connected to said delay circuit so as to apply a control pulse to said delay circuit, the output of said delay circuit being connected through said timer circuit to the control input of said control gate whereby after a predetermined time interval a control signal is applied to said control gate to allow said control gate to pass the output of said shift register.

18. A transmitter as claimed in claim 17 wherein said transmitting means includes a preamplifier, a signal gate, and a power amplifier, the output of said modulator being connected to the input of said preamplifier, the output of said preamplifier being connected to the signal input of said gate and the output of said gate being applied to the input of said power amplifier, the output of said control gate being connected to the control inputs of said signal gate to inhibit or enable the passage of the continuous tone signal being generated by said modulator.

19. A receiver suitable for use in a continuous tone controlled location identification system comprising:
1. receiving means for receiving continuous tone and binary location identification code signals; and,
2. decoding means connected to said receiving means for decoding the binary location identification code portion of the received signals, said decoding means comprising:
   a. a level detector having its input connected to the output of said receiving means,
   b. a time delay circuit responsive to the level detector; and,
   c. a binary storage means having its input connected to the output of said time delay circuit for storing said location identification binary code; and,
3. a display means connected to the output of said binary storage means for displaying the location identification binary code stored by said binary storage means, said decoding means further including:
a level clamping circuit connected between said receiving means and said level detector;
a synchronizing gate having signal and control inputs, the signal input being connected to the output of said level detector;
a synchronizing flip-flop having its set input connected to the output of said synchronizing gate;
a delay circuit having its input connected to the output of said synchronizing flip-flop;
a hold and enable circuit having signal and control inputs, the signal input being connected to the output of said delay circuit;
a clock having its trigger input connected to the output of said hold and enable circuit;
a gate control circuit having its input connected to the output of said clock and having a plurality of control outputs, one of said control outputs being connected to a control input of said level detector, a second control output being connected to the control input of said hold and enable circuit, a third control output being connected to the control input of said ring counter, and a fourth control output being connected to said synchronizing gate; and,
a signal gate having a signal input connected to the output of said gate control circuit and a control input connected to an output of said gate control circuit and an output connected to the input of said binary storage means.

20. A receiver as claimed in claim 19 including:
a differential amplifier having one input connecting the output of said level clamping circuit;
a potentiometer connected between voltage sources of opposite polarity and having its wiper arm connected to the second input of said differential amplifier; and,
a monostable flip-flop having its input connected to the output of said differential amplifier and its output connected to the input of said level detector.

21. A receiver as claimed in claim 20 wherein said continuous tone and said location identification binary code signals are in the range between sub-audio and low frequency audio signals.

22. A receiver suitable for use in a continuous tone controlled location identification system comprising:
1. receiving means for receiving continuous tone and binary location identification code signals; and,
2. decoding means connected to said receiving means for decoding the binary location identification code portion of the received signals, said decoding means comprising:
   a. a level detector having its input connected to the output of said receiving means,
   b. a time delay circuit responsive to the level detector; and,
   c. a binary storage means having its input connected to the output of said time delay circuit for storing said location identification binary code; and,
3. a display means connected to the output of said binary storage means for displaying the location identification binary code stored by said binary storage means, said binary storage means comprising:
a bit amplifier and logic circuit having its signal input connected to the output of said signal gate and a control input connected to an output of said gate control circuit;
a first shift register having its signal input connected to the output of said bit amplifier and logic circuit and its control input connected to an output of said gate control circuit;
a first 5/9 decision logic circuit having its control input connected to an output of said gate control circuit and having its control output connected to said first shift register;
a second shift register having its signal input connected to the output of said first shift register and its control input connected to the output of said gate control circuit;
a second 5/9 decision logic circuit having its control input connected to an output of said gate control circuit and its control output connected to said second shift register;

a third shift register having its signal input connected to the output of said second shift register and having its control input connected to an output of said gate control circuit, the output of a predetermined stage of said third shift register being connected to the reset inputs of said synchronous flip-flop; and gate control circuit and said first and second shift registers;

a slave clock circuit having its control input connected to an output of said gate control circuit and having its clock output connected to the clock inputs of said first, second and third shift registers, said slave clock also being connected to said bit amplifier and logic circuit; and, a binary-coded decimal to display circuit having its signal inputs connected to the signal outputs of said first, second and third shift registers.

23. A receiver as claimed in claim 22 wherein said display means is formed of first, second and third decimal display devices separately connected to outputs of said binary-coded decimal to display circuit.

24. A receiver suitable for use in a continuous tone controlled location identification system comprising:

1. receiving means for receiving continuous tone and binary location identification code signals; and,
2. decoding means connected to said receiving means for decoding the binary location identification code portion of the received signals, said decoding means comprising:
   a. a level detector having its input connected to the output of said receiving means,
   b. a time delay circuit responsive to the level detector; and,
   c. a binary storage means having its input connected to the output of said time delay circuit for storing said location identification binary code; and,
3. a display means connected to the output of said binary storage means for displaying the location identification binary code stored by said binary storage means, said decoding means further including a level clamping circuit connected to the output of said receiving means;

a differential amplifier having one input connected to the output of said level clamping circuit;

a monostable multivibrator having its input connected to the output of said differential amplifier and its output connected to the input of said level detector;

first and second delay circuits having their inputs connected to an output of said monostable multivibrator;

a control flip-flop having its reset input connected to the output of said first delay circuit;

a potentiometer connected across voltage sources of opposite polarity and having its center tap connected to the output of said control flip-flop, the wiper arm of said potentiometer being connected to the second input of said differential amplifier;

a gate control circuit having an input connected to the output of said second delay circuit, said gate control circuit having a plurality of outputs one of said control outputs being connected to a disable input of said second delay circuit, a second control output being connected to said level detector, a third control output being connected to the set input of said control flip-flop;

a signal gate having its signal input connected to the output of said level detector and its control input connected to a further control output of said gate control circuit;

a synchronizing gate having its signal input connected to the output of said level detector;

a synchronizing flip-flop having its set input connected to the output of said synchronizing gate;

a hold and enable circuit having signal and control inputs, the signal input being connected to the output of said synchronizing gate and the control input being connected to an output of said gate control circuit; and, a clock having its control input connected to the output of said hold and enable circuit and its signal output connected to said gate control circuit.

25. A receiver as claimed in claim 24 wherein said binary storage means comprises:

a bit amplifier and logic circuit having its signal input connected to the output of said signal gate and a control input connected to an output of said gate control circuit;

a first shift register having its signal input connected to the output of said bit amplifier and logic circuit and its control input connected to an output of said gate control circuit;

a first 5/9 decision logic circuit having its control input connected to an output of said gate control circuit and having its control output connected to said first shift register;

a second shift register having its signal input connected to the output of said first shift register and its control input connected to the output of said gate control circuit;

a second 5/9 decision logic circuit having its control input connected to an output of said gate control circuit and its control output connected to said second shift register;

a third shift register having its signal input connected to the output of said second shift register and having its control input connected to an output of said gate control circuit, the output of a predetermined stage of said third shift register being connected to the reset inputs of said synchronous flip-flop, said gate control circuit and said first and second shift registers;

a slave clock circuit having its control input connected to an output of said gate control circuit and having its clock output connected to the clock inputs of said first, second and third shift registers, said slave clock also being connected to said bit amplifier and logic circuit; and, a binary-coded decimal to display circuit having its signal inputs connected to the signal outputs of said first, second and third shift registers.

26. A receiver as claimed in claim 25 wherein said display means is formed of first, second and third decimal display devices separately connected to the output of said binary-coded decimal to display circuit.

* * * * *